Patented May 19, 1936

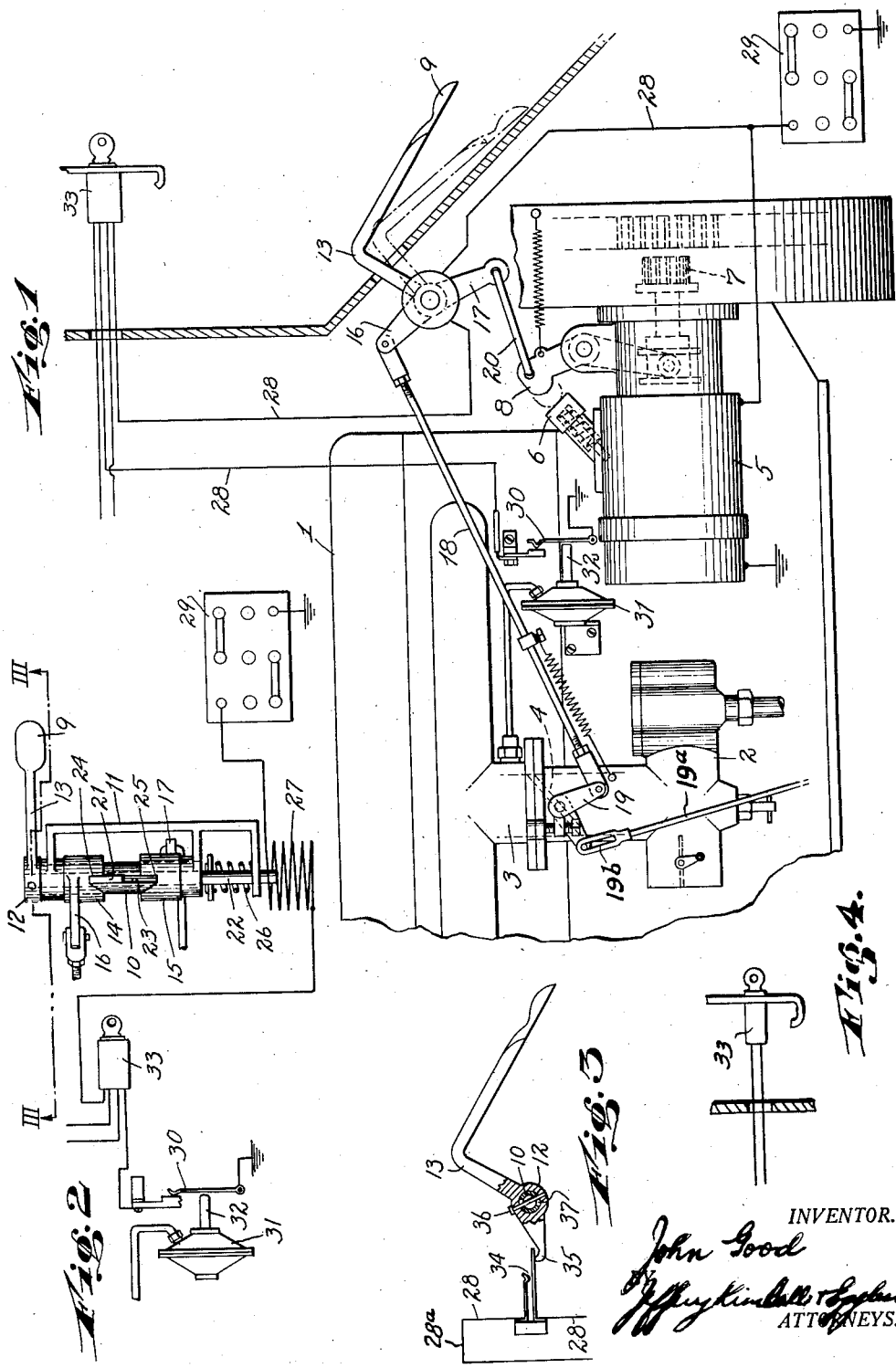

2,041,541

UNITED STATES PATENT OFFICE 2,041,541

AUTOMATIC DRIVING CONTROL

John Good, Garden City, N. Y., assignor to Automatic Motor Stop and Start, Inc., New York, N. Y., a corporation of New York Application March 22, 1932, Serial No. 600,437

7 Claims. (Cl. 290—38)

The object of the invention is to make more certain and reliable and otherwise improve the action of automobile control systems of the kind in which the engine cranking agency is available for actuation by the driver only when the engine requires to be started and in which at other times, that is, when the engine is running, the control member for such agency is ineffective for that purpose but may be arranged to perform some other function in the control of the engine or vehicle.

Such a system is illustrated in my copending application, Ser. No. 569,930, filed October 20, 1931, in which one of the operator's controls, namely, the normal throttle pedal, or accelerator, is organized to do the work of controlling the engine cranking agency whenever the engine requires to be started and, at other times, to perform its normal speed controlling function, and while capable of various applications my invention is herein shown and described with reference to such a system.

In the drawing, Fig. 1 is an elevation of part of a conventional automobile engine, its cranking motor etc., with a preferred form of the invention applied thereto; Fig. 2 is a plan of parts of the same organization, largely in diagram, and Figs. 3 and 4 illustrate modifications.

In the conventional automobile power plant illustrated, the engine 1 is furnished with fuel from the carbureter 2 by way of suction intake 3 under the control of a throttle 4. The engine is started by a cranking motor 5 having a starting switch 6 adapted to be closed and a starter pinion 7 adapted to be moved to starting position, coincidently, through the action of a lever 8, this being the usual "positive" type starter system, although not essential to the invention. According to the control system to which the present improvements are herein applied for purposes of illustration, the accelerator pedal 9, located in its customary position accessible to the driver, is arranged to control both the throttle 4 and the starting lever 8. To this end a sleeve 10 (Fig. 2) is journaled in the arms of a fixed bracket 11 and to this sleeve is secured the hub 12 of the lever 13 which carries the accelerator pedal. Journaled on the sleeve are the hubs 14 and 15 of crank arms 16 and 17 which are connected respectively through rod 18 to throttle crank 19 and through link 20 to lever 8.

Movement of the accelerator pedal and sleeve 10 is transmitted to one or the other of the crank arm hubs 14 and 15 by a connecting member in the form of a key 21 which is set in a shaft or stem 22 movable endwise within the sleeve, the key projecting radially through an elongated slot 23 therein and engaging a beveled slot 24 in hub 14 or a corresponding slot 25 in hub 15 according to the longitudinal position of stem 22. All of the foregoing, with various modifications thereof, is described in the said copending application, but in the form of structure herein illustrated.

The key or connecting member which determines the effectiveness or otherwise of the operator's control, or pedal, to energize the starter, is normally out of its starter-connecting position and is automatically moved into and occupies that position, temporarily, whenever the engine requires to be cranked.

As shown in the drawing, the stem 22 is urged toward lever hub 14 by a spring 26 so that in its normal position key 21 occupies slot 24 of hub 14, and pedal 9, through crank arm 16, rod 18 and crank 19, controls the throttle opening. The position of stem 22 is also controlled magnetically, however, as by a solenoid 27 which, when energized, pulls out the stem to engage the key with slot 25 and holds it there against the action of spring 26, under which condition depression of pedal 9, through crank arm 17, link 20 and lever 8, renders the starter active to crank the engine.

The circuit 28 of the solenoid, connected to battery 29, is provided with two controls which, for convenience, are indicated as independent series-related switches, one of them, marked 30, serving to break circuit 28 and de-energize the solenoid (so that spring 26 will move the stem and key out of their starter-connecting position) whenever the engine is active. Any suitable engine-operated means may be used for this purpose but I prefer to employ a suction-responsive device such as 31 connected to the intake 3 and responding to the suction of the running engine to move the stem 32 to open switch 30. When the engine is dead the switch 30 is, of course, closed.

The other switch for the solenoid circuit is under the control of the operator and may be arranged to be closed prior to the starting of the engine and to remain closed throughout its operation. Such an arrangement is illustrated in Fig. 1 in which the solenoid circuit is shown carried up to the instrument board and controlled by the usual ignition switch 33 so that the operator in turning on the engine ignition coincidently energizes the solenoid circuit. The stem 22 and key 21 are thereby moved to starter-connecting position so that when pedal 9 is depressed the starter is operated to crank the engine. When the latter starts, the intake vacuum acts through the suction device 31 to open switch 30 and break the solenoid circuit which cannot thereafter be re-energized to again move the stem and key to starter-connecting position while the engine is active. When the engine stops the suction device permits switch 30 to close the solenoid circuit at that point ready for the next starting of the engine.

Alternatively, the solenoid may be controlled by a switch arranged to be closed temporarily, during each starting of the engine and preferably without requiring conscious attention by the operator. For example, such a switch may be controlled by pedal 9 itself, a gap 34 in its circuit being arranged to be closed by a short lever arm 35 (Fig. 3) projecting from hub 12. In this case hub 12 is secured to sleeve 10 by a pin and slot connection 36, 37, the slot 37 permitting sufficient rotation of hub 12 to cause lever arm 35 to close switch 34 before sleeve 10 and key 21 are rotated; otherwise the solenoid would not be energized and the stem 22 would not be pulled toward its starter-connecting position until after the key had been rotated out of axial alignment with slot 25, which it then could not enter. With this alternative arrangement of solenoid control circuit, connections 28, instead of extending to and through switch 33, as in Fig. 1, are united, as as 28a (Fig. 3) and, as illustrated in Fig. 4, the dash switch 33 serves only its usual ignition-controlling function. Although the gap 34 is closed upon each depression of the pedal it is ineffective whenever the engine is running because then, as above described, the solenoid circuit is broken at switch 30.

With neither of these forms of solenoid circuit control is any sensitive adjustment or special timing of the engine-operated means 31 necessary. Even if switch 30 be opened or the solenoid otherwise de-energized while the engine is being cranked and before it fires, spring 26 will be ineffective to return the stem 22 to its normal position because the preferred construction illustrated is such that until pedal 9 is released, key 21 is "pinched" between the sidewall of slot 23 and the face of slot 25 and is thereby held in its starter-connecting position independently of the solenoid. Nor is the system affected by temperature or other conditions which vary the cranking or idling speed and engine suction, the slight amount of power required for the engine-operated device 31 (which constitutes a relay controlling the application of power to move stem 22) being available as long as the engine is active.

In an automobile thus equipped, the driver performs only the usual operations incident to setting the car itself in motion and without any concern as to whether or not the engine is running, because depression of the accelerator pedal automatically cranks the engine, if it is inactive, or speeds it up, should it already be active, without any conscious selection by the operator of the particular pedal function appropriate to the condition of the engine. It will be understood however that in order to facilitate starting when the engine is cold the fuel supply may be increased, as necessary, by appropriately setting the usual hand control prior to cranking. In Fig. 1 rod 19a will be recognized as a connection to the usual hand throttle control, such control (by reason of the slotted connection 19b) not being affected by the pedal adjustment of the throttle. Moreover, manual adjustment of rod 19a to open the throttle is ineffective to actuate the starter mechanism, for the reason that notwithstanding rod 19a serves to actuate rod 18 and the latter to rotate hub 14, the hub is not secured to sleeve 10 but is journaled on it, as above described.

I claim:

1. In an automobile the combination of an engine, a suction intake, a throttle in said intake, an electric cranking motor having a circuit and a starting switch therein, an accelerator pedal accessible to the driver, a connecting member movable to connect either the pedal and throttle or the pedal and switch, means normaly urging said member to its said first position, a circuit including two control switches and magnetic means adapted when energized to move said member to its second position, one of said control switches arranged for closure by the accelerator pedal and a suction-responsive device connected to said intake and arranged to open the other control switch whenever the engine is active.

2. In an automobile the combination of an engine, a fuel throttle operable to vary the engine speed at will, an electric cranking motor having a circuit and a starting switch therein, an accelerator pedal accessible to the driver, a connecting member movable to connect either the pedal and throttle or the pedal and switch, means normally urging said member to its said first position, a circuit including a solenoid adapted when energized to move said member to its second position, a switch in the solenoid circuit adapted to be closed by the accelerator pedal and engine-operated means also controlling the solenoid circuit adapted to deenergize the solenoid when the engine is active.

3. In an automobile the combination of an engine, a fuel throttle operable to vary the engine speed at will, an electric cranking motor having a circuit and a starting switch therein, an accelerator pedal accessible to the driver, a connecting member movable to connect either the pedal and throttle or the pedal and switch, means normally urging said member to its first mentioned position, an engine ignition switch, a circuit adapted to be energized by the closure of the ignition switch and including magnetic means for moving said member to its other position, and engine-operated means for de-energizing said magnetic means.

4. In an automobile the combination of an engine, a fuel throttle operable to vary the engine speed at will, an electric cranking motor having a circuit and a starting switch therein, an accelerator pedal accessible to the driver, a connecting member movable to connect either the pedal and throttle or the pedal and switch, means normally urging said member to its said first position, a solenoid circuit including a solenoid adapted when energized to move said member to its second position, a switch in said solenoid circuit having engine-operated means controlling the same and adapted to open or close the switch according as the engine is active or inactive and a second switch in the solenoid circuit under the control of the operator.

5. In an automobile the combination of an engine, a fuel throttle operable to vary the engine speed at will, an electric cranking motor having a circuit and a starting switch therein, an accelerator pedal accessible to the driver, a connecting member movable to connect either the pedal and throttle or the pedal and switch, means normally urging said member to its said first position, a solenoid circuit including a solenoid adapted when energized to move said member to its second position, a switch in said solenoid circuit and engine-operated means controlling the same adapted to open or close the switch according as the engine is active or inactive.

6. In an automobile the combination of an engine, a fuel throttle operable to vary the engine speed at will, an electric cranking motor having a circuit and a starting switch therein, an accelerator pedal accessible to the driver, a connecting member movable to connect either the pedal and throttle or the pedal and switch, means normally urging said member to its said first position and a solenoid adapted when energized to move said member to its second position.

7. In combination with an engine, a throttle in control of the fuel supply thereto, engine cranking mechanism and a single operator's pedal for operating the throttle and rendering active said mechanism, of means for controlling the pedal action with respect to said mechanism including a circuit, a switch controlling a gap therein, said switch adapted to be closed by the initial movement of the pedal upon each depression thereof, a rock shaft arranged to operate alternatively the throttle or said mechanism and a lost motion connection between said pedal and shaft whereby the switch is closed prior to the rocking of the shaft.

JOHN GOOD.